United States Patent [19]

Barnett et al.

[11] Patent Number: 5,428,816
[45] Date of Patent: Jun. 27, 1995

[54] METHOD AND APPARATUS FOR MOBILE ASSISTED HANDOFF

[75] Inventors: Charles A. Barnett, Sterling, Va.; Naresh Durvasula, Gaithersburg, Mass.

[73] Assignee: Hughes Aircraft Company, Los Angeles, Calif.

[21] Appl. No.: 118,555

[22] Filed: Sep. 9, 1993

[51] Int. Cl.⁶ ............................................... H04B 7/26
[52] U.S. Cl. ................................... 455/33.2; 455/56.1; 379/60
[58] Field of Search ............... 455/33.1, 33.2, 34.1, 455/54.1, 56.1, 54.2, 62, 67.1, 67.3; 379/59, 60, 63

[56] References Cited

U.S. PATENT DOCUMENTS 5,200,957  4/1993  Dahlin ............................. 455/33.1
5,260,943  11/1993  Comroe et al. ................ 455/33.2

Primary Examiner—Reinhard J. Eisenzopf
Assistant Examiner—Thanh Le
Attorney, Agent, or Firm—Gordon R. Lindeen, III; Wanda K. Denson-Low

[57] ABSTRACT

A method and system for selecting the best handoff candidate cell at times when the number of neighboring cells that meet the measurement criteria is greater than twelve a measurement list is generated. The cells are assigned a handoff measurement priority wherein a handoff priority of zero is assigned to 12-N cells where N is between 1 and 6. A priority of 8 is assigned to the worst N cells. A new measurement list is generated using the 12-N cells and other unreported cells having a higher priority than the N worst cells.

15 Claims, 8 Drawing Sheets

METHOD AND APPARATUS FOR MOBILE ASSISTED HANDOFF

BACKGROUND OF THE INVENTION

1. Field of Invention

The present invention relates to cellular communication; and more particularly to a method and apparatus for mobile assisted handoff.

2. Description of Related Art

A cellular communication system includes several base transceiver stations, each of which transmits and receives channels of RF information throughout a predetermined coverage area referred to as a cell. The outer boundary of a cell is determined not only by the effective radiated power of the base transceiver, which determines the maximum range at which a mobile unit is able to receive; but also, by the effective radiated power of the mobile telephones, which determines the maximum range at which the base station is able to receive. The base transceiver stations (BTS) determine their corresponding cell's handoff boundaries by setting an RF signal threshold value which must be met or exceeded by a mobile unit entering the cell in order to transfer an on-going call to that cell.

In typical cellular installations, each BTS has several scanning receivers that periodically, or on command, measure the RF signal strength of selected traffic channels in order to determine the range of active mobile telephones relative to the transceiver of the cell in which the mobile telephone is located, referred to herein as a serving cell, and the proximity of the mobile unit to neighboring cells, which may overlap the serving cell.

In cellular communication systems with digital capability, the mobile unit also has a scanning receiver for measuring the signal strength of neighboring cells, and reporting this signal strength to the base station.

In such digital systems, at a certain drop in the signal level, the base station initiates mobile assisted handoff by sending a measurement order to the mobile unit in accordance with standard protocol. This measurement order may accommodate up to twelve neighboring cell RF channels, for example, to be measured by the mobile unit. Once the mobile unit reports the signal strengths of the twelve requested RF channels, the base station at the serving cell determines the best neighboring cell from the measurements reported by the mobile unit and initiates the handoff process.

In the event that none of the cells reported by the mobile unit meet the handoff criteria, the measurement order is repeated until the mobile unit has reached a location where at least one of the scanned cells meets the criteria for handoff.

Since the goal of the base station is to handoff to the best neighboring cells, where there are more neighboring cells in the measurement order list than the maximum number of cells able to be scanned at one time by the mobile unit, it is only by chance that the best neighboring cell is included in any of the measurement order to the mobile unit.

This, of course, results in substandard communications, particularly where the mobile unit is closer to a cell other than the one having the traffic channel to which the mobile unit was handed off. It also results in excessive handoffs because the signal strength of the cell to which the mobile unit is handed off may have a signal strength close to the threshold level of another neighboring cell; and also may result in an unbalanced distribution of calls on neighboring cells.

In light of the foregoing, there is a need for an apparatus and method of handing off an on-going communication in a mobile assisted handoff (MAHO) that overcomes one or more of the disadvantages of prior arrangements.

SUMMARY OF THE INVENTION

Accordingly, the present invention is directed to a method and system that substantially obviates one or more of the problems due to limitations and disadvantages of the related art.

To achieve these and other advantages, and in accordance with the purpose of the present invention, as embodied and broadly described, the invention is a method of handing off on-going communication of a mobile unit leaving a serving cell to a neighboring cell of a cellular communication system. The method provides for requesting a mobile unit to measure a portion of the total predetermined number of designated channels, reporting to the base station of the serving cell the signal strength measurement of each of the requested channels; replacing a portion of the reported channels with an unreported portion of the total predetermined number of the channels at times when none of the reporting channels meet a handoff criteria; repeating the steps of reporting until all cells of the measurement list are reported; and performing handoff to one of the reported traffic channels at times when the one reported channel meets a predetermined handoff criteria.

In another aspect, a system for handing off an on-going communication of a digital mobile unit in a serving cell to a neighboring cell of a cellular communication system to one of a plurality of neighboring cells of a cellular communication system wherein the digital mobile unit is limited to scanning at any one time a predetermined total number of neighboring cells, the apparatus including means in each cell responsive to a transmission signal threshold of a mobile unit for initiating a mobile assisted handoff; means responsive to the initiated handoff for generating a measurement list of identified neighboring cells for transmission to the mobile unit; means for receiving at the cell base station, signal strength measurements of the measurement list reported by the mobile unit; means for replacing a portion of the reported cells with another selected portion of the total predetermined number of cells in the measurement list at times when the total number of cells in the measurement list is greater than a predetermined number; means for repeating the generation of the measurement list and the receiving of the reported signal measurements until all cells of the measurement list are reported; and means for handing off the mobile unit communication to one cell of the reported cells of the signal strength measurement list at times when the signal strength of said reported cell meets a predetermined criteria.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together

DESCRIPTION OF PREFERRED EMBODIMENT

Figure 1:
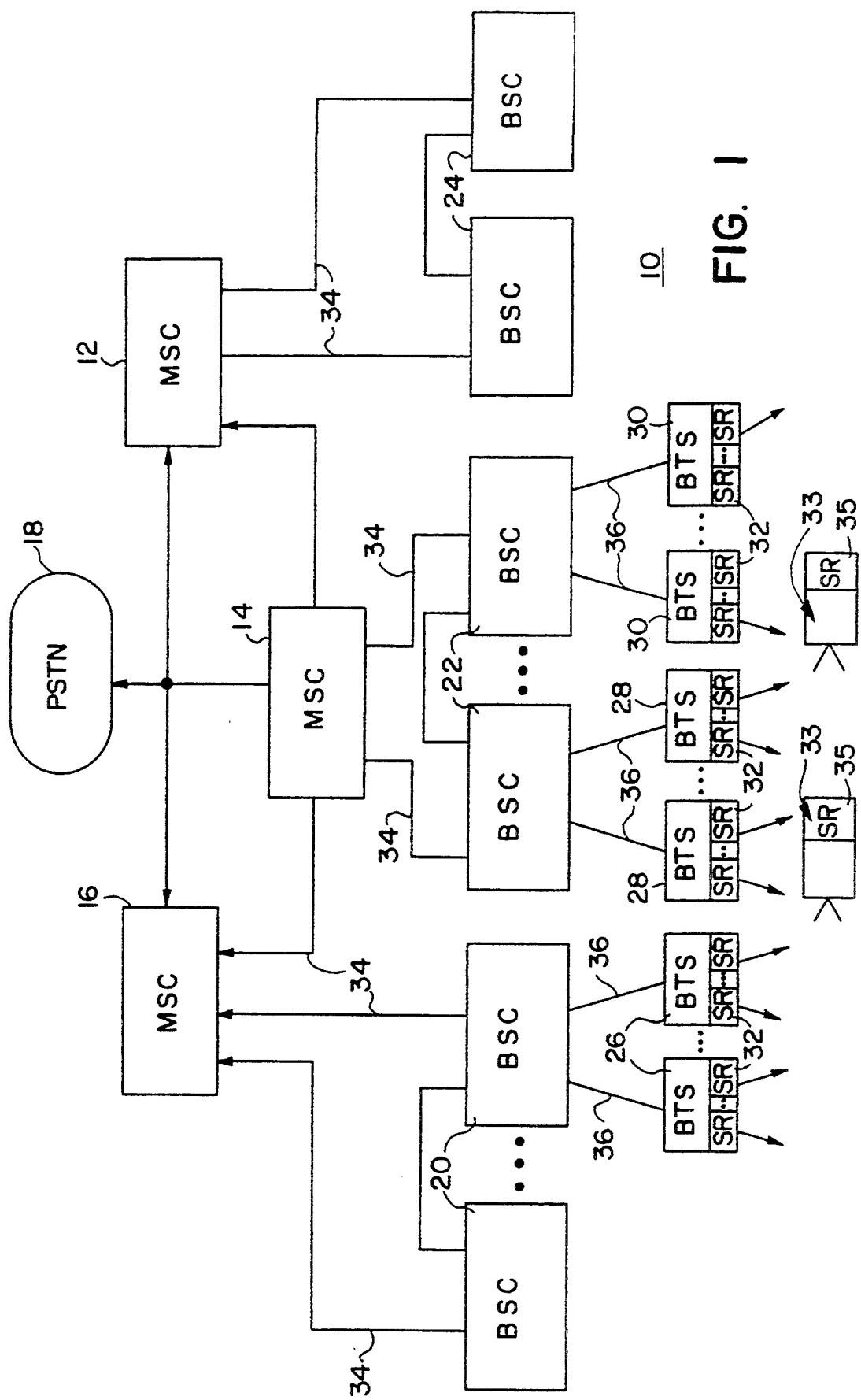
FIG. 1 is a block diagram of a cellular communication system incorporating the principles of the present invention.

A system for effecting handoff of an on-going mobile telephone communication from a serving cell to a neighboring cell is included in and is part of a cellular communication system as exemplified in FIG. 1, which system is generally referred to as 10.

Cellular system 10 has a plurality of mobile switching centers (MSC) 12, 14 and 16 which are connected to each other and to a public switched telephone network (PSTN) 18. Each of the MSC's is connected to a respective group of base station controllers (BSC), each group being referred to as 20, 22 and 24. Each BSC is connected to a group of individual base transceiver stations (BTS) referred to as 26, 28, and 30 respectively. Each BTS defines an individual cell of the communication system.

Each BTS of the groups 26, 28, and 30 includes hardware and software functions required to communicate over the radio channels of the system; and includes transmitters and receivers for communication with the mobile telephone units. Each BTS also includes a plurality of individual scanning receivers (SR) referred to at 31 for scanning selected traffic channels. Each BTS also includes digital multiplex equipment for transmission of audio traffic to its associated BSC.

A plurality of digital mobile units 33 are used with a system for communication over RF traffic channels with the BTS of a particular cell in which it is located. Associated with each digital mobile unit 33 is a scanning receiver 35 for scanning selected channels of the serving and neighboring cells.

Each BSC of group 20, 22, and 24 implements audio compression/decompression and handles call establishment, disconnect, and handoff procedures, and allocates system resources between the individual BTS's associated with a particular BSC. More specifically, each BSC performs handoff execution for transferring on-going communications from one cell to another within the group of BTS's connected to the particular BSC. Each BSC communicates with its associated MSC for effecting a handoff involving a cell or BTS associated with a different BSC. Each MSC 12, 14, and 16 processes all requests for calls, switching functions, as well as the mobility functions of registration, authentication and handoff. Each MSC includes a home location register (HLR), which is a permanent data base of all subscribers and a visitor location register (VLR), which is a semi-permanent data base for users who are recently active in the area served by the MSC.

Figure 2:
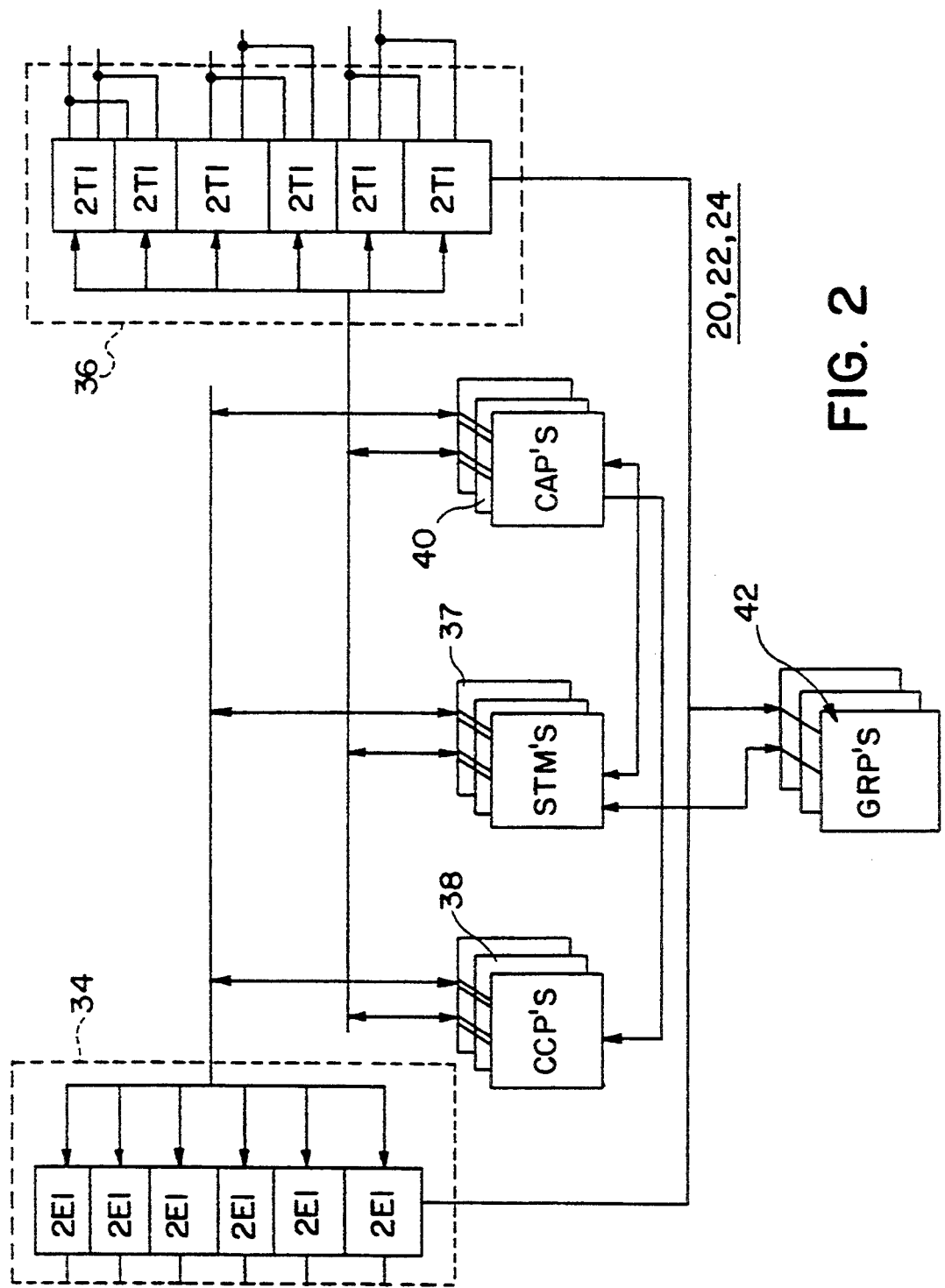
FIG. 2 is a diagram of a base station controller utilized in carrying out the present invention.

Referring to FIG. 2, each BSC 20, 22 and 24 includes trunk interfaces 34 to its associated MSC and trunk interfaces 36 to its associated BTS. Also, each BSC includes a switching and transcoding module (STM) 37. Additionally, each BSC is made up of three types of control processors, which are implemented in identical hardware modules 38, 40, and 42.

Module 38 is a call control processor (CCP). In addition to switching of pulse code modulation (PCM) traffic between trunks 34 and 36 for analog traffic, it terminates call protocol for mobile switching, such as fast analog control channel (FACCH)/slow analog control channel (SACCH) processing and handoff execution. CCP also communicates with MSC for handoff execution. It also performs connection control and mobility management for handoff execution as hereinafter described in detail. For digital configurations there can be more than one CCP for each BSC. When there is more than one CCP per BSC, calls are distributed among CCP's based upon load. The number of CCP's depend upon load and redundancy requirements.

Hardware module 40, which is a channel access processor (CAP), is required for digital configurations as described herein and performs voice channel allocations and deallocations and forwards power and time alignment measurements to the CCP's. Handoff measurement involving mobile assisted handoff of the present invention is initiated at the CCP module 38 by sending a mobile measurement request message to the channel access processor CAP module 40. The CAP generates the measurement list and sends to the mobile unit a measurement order containing the control or traffic channels of the neighboring cells. The mobile unit then measures the RF signal strength at its scanning receiver and periodically sends a channel quality measurement message to the base station controller.

Hardware module 42 is a global resource processor (GRP) that distributes calls among the CCP's based on load; and communicates with other BSC's for scanning receiver measurements; that is, a GRP communicates with another BSC to exchange messages relating to scanning (SR) measurements.

Figure 3:
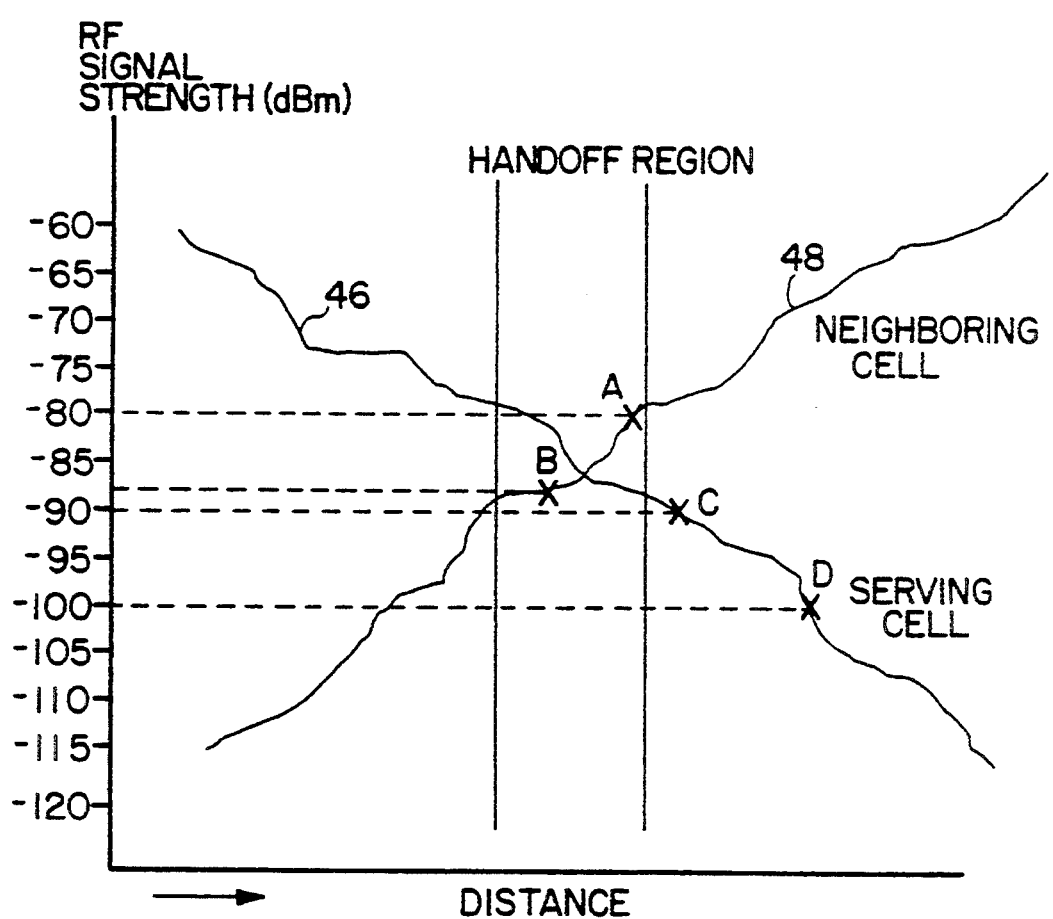
FIG. 3 is a diagram illustrating the relative RF signal strengths of a handoff region.

Referring to FIG. 3, typically the signal strength of a particular cell may range from minus forty dBM at the center of a cell to minus one hundred twenty dBM beyond the boundary of the cell. Assuming that a mobile unit is traveling outwardly from a serving cell in the direction of the arrow, the receive signal strength of the traffic channel decreases as indicated by line 46. The receive signal strength of the traffic channel of the neighboring cell reported by the scanning receiver of the mobile, of course, increases at the mobile unit as it travels out of the serving cell as indicated by line 48. In initially determining the RF signal strength for a nominal threshold the RF signal strength measurement is calibrated at both the neighboring cell and the serving cell as the mobile travels in the direction of the arrow. While these measurements are being calibrated, the mobile transmit attenuation level is set by a command from the BSC to the minimum level allowed by the serving cell. After completion of the measurements, a diagram similar to FIG. 3 may be plotted; and a point can be selected at a level where adequate signal quality can be maintained while at the same time minimizing RF interference in the cellular network.

There are two fixed thresholds to be considered when calibrating the system initially. The first is a measurement threshold where handoff measurement is requested. The second is the fixed nominal cell selection threshold at which the mobile unit is transferred from the serving cell to the neighboring cell. The measurement threshold is selected so that a call does not keep handing off back and forth between cells.

Referring to FIG. 3 assume that the handoff cell selection threshold signal strength is point A, which is approximately minus eighty dBm, then the RF signal strength of the measurement threshold may be at point B between minus eighty-five and ninety dBm. A critical handoff-threshold may be chosen at point D, for example, and the handoff measurement threshold of the neighboring cell might be chosen to be point C, for example.

Handoff measurement mechanism may be based upon a base transceiver station scanning receiver, a mobile assisted handoff, or a mobile assisted handoff with scanning receiver confirmation. At times, a preferred handoff measurement mechanism is not compatible with the assigned call made; and therefore, the preferred mechanism is overridden. For example, a base station scanning receiver assisted handoff is used for an analog communication. Mobile assisted handoff is used for digital, and whenever a particular class of cells is present in a neighboring measurement list, and a base transceiver station scanning receiver is the preferred handoff measurement mechanism, a mobile assisted handoff with base station scanning receiver confirmation is used.

Each neighboring cell has a measurement class and priority associated with a serving cell. These parameters are predetermined according to terrain, topology and other factors influencing their transmission and reception capabilities. The base station may include in the measurement list some or all of the neighboring cells to be measured by the mobile unit for handoff by specifying an appropriate measurement class.

For example, all the neighboring cells which meet the measurement class criteria are ordered according to their measurement class and associated priority. For example, a neighboring cell with a measurement class I and a priority 4 is placed above a neighboring cell with a measurement class I and priority 5, which in turn is placed above a neighboring cell with a measurement class 2 and a priority 1 in the ordered neighboring cell list.

A measurement order command containing twelve, for example, of the highest ordered neighboring cell frequencies (RF channels) as determined from the above mentioned classification and prioritization, is sent to the scanning receiver of the mobile unit for measurement. The mobile unit performs the measurements of these twelve RF channels and reports the results to the base station of the serving cell in the form of a channel quality measurement (CQM) message. If a suitable neighboring cell meets all criteria for handoff as determined from the CQM, the handoff process for that particular cell is initiated.

In accordance with the invention, in the event none of the cells reported to the BSC meet the handoff criteria, then a predetermined number of selected reported cells are replaced by traffic channels of other unreported cells and the measurement order of the base station controller is repeated. These steps are repeated until the RSS1 measurement of at least one of the cells meets the predetermined handoff criteria.

In accordance with the invention, if more than the maximum number of cells are in a measurement list. Handoff priority of zero to handoff measurement priority of twelve N best cells. N may be from one to six for example. Handoff measurement priority eight, the lowest priority is given to N worst cells. A new measurement list is generated and sorted based upon the handoff measurement priority. If the number of cells are more than 12, the twelve best cells are selected. Decrement handoff measurement priority those cells in the generated measurement list that were not included in the mobile measurement list.

Prior to describing in detail the exemplary embodiment of a method and apparatus for effecting the handoff from a serving cell to a neighboring cell of the present invention, an explanation and detailed description of the meaning of the letter designations of the drawings is set forth.

The designation RSSI-SRV refers to the RF signal strength of a mobile unit operating in a serving cell and measured by the serving cell. This signal also may be the traffic channel RF signal strength of the mobile unit in the serving cell. The designation RSSI-NBR refers to the RF signal strength of a neighboring cell as detected by the mobil unit. RSSI-THP refers to a dynamic cell selection threshold that is determined in accordance with certain operating criteria of the system, the details of which form no part of the present invention. The designation RSSI-MSR-S refers to the RF signal strength measurement threshold of the of the neighboring cell. RSSI-MSR-S determines when a given neighboring cell is included in a measurement list. The designation RSSI-MSR-T refers to the RF signal strength measurement threshold of a serving cell as a neighbor of the neighboring cell.

The designation MT refers to the current transmit attenuation level of a mobile unit. MM refers to the minimum attenuation level of the mobile unit MS refers to the minimum attenuation level permitted by the serving cell; and MN refers to the minimum attenuation level permitted by the neighboring cell.

The designation RSSI-NBR' refers to an RF signal strength measurement that is normalized as described. The normalized traffic channel's signal strength indicator (dBm) of the neighboring cell RSSI-NBR' may be expressed as follows:

$$RSSI\text{-}NBR' = (RSSI\text{-}NBR) + (MT\text{-}MN) * 4 \text{ when } MM <= MN$$

or $$RSSI\text{-}NBR' = (RSSI\text{-}NBR) + (MT\text{-}MM) * 4 \text{ when } MM > MS$$

The parameters used in handing off the on-going mobile communications in accordance with the present invention are either listed in the BSC where they relate to a status or a design of the system, or calculated in the BSC based on measurements taken at the mobile unit.

In configuring the cells in a cellular network, neighboring cells are configured for each cell. These neighboring cells are assigned a measurement class (one to three) and a priority (one to eight), for example. The handoff measurement RF signal strength threshold (RSSI-MSR) for each neighboring cell is also determined prior to configuration of the system and entered along with the cell class and priority.

Class I neighboring cells may be included in the handoff measurement list as soon as a traffic channel is activated in the serving cell. Class II neighboring cells are included in the handoff measurement list when RSSI-MSR is greater than the serving cell's traffic channel signal strength (forward or reverse). Class III neighboring cell are included in the handoff measurement list when the serving cell's traffic channel signals strength falls below the critical RF signal strength threshold (RSSI-C).

The neighboring cell priority designation is used after the handoff candidate cell selection process is completed to arrange the cells in a preferred ordering for handoff.

Prior to sorting the handoff candidate cells, a signal strength increment (dBm) is added to the normalized neighboring cell's RF signal strength measurement, either mobile or scanning receiver assisted handoff. The signal strength increment is computed as follows:

[maximum priority-neighboring cell priority]*
dBm per priority step level

The handoff candidate cells are then sorted in descending order based on neighboring cells' adjusted RF signal strength. Handoff is then attempted to the first cell in the list. If call resources are not available, the next cell in the list is tried until a suitable cell is found for handoff. The handoff candidate cell selection process continues as long as handoff measurement criteria are met or until handoff takes place.

Figure 4:
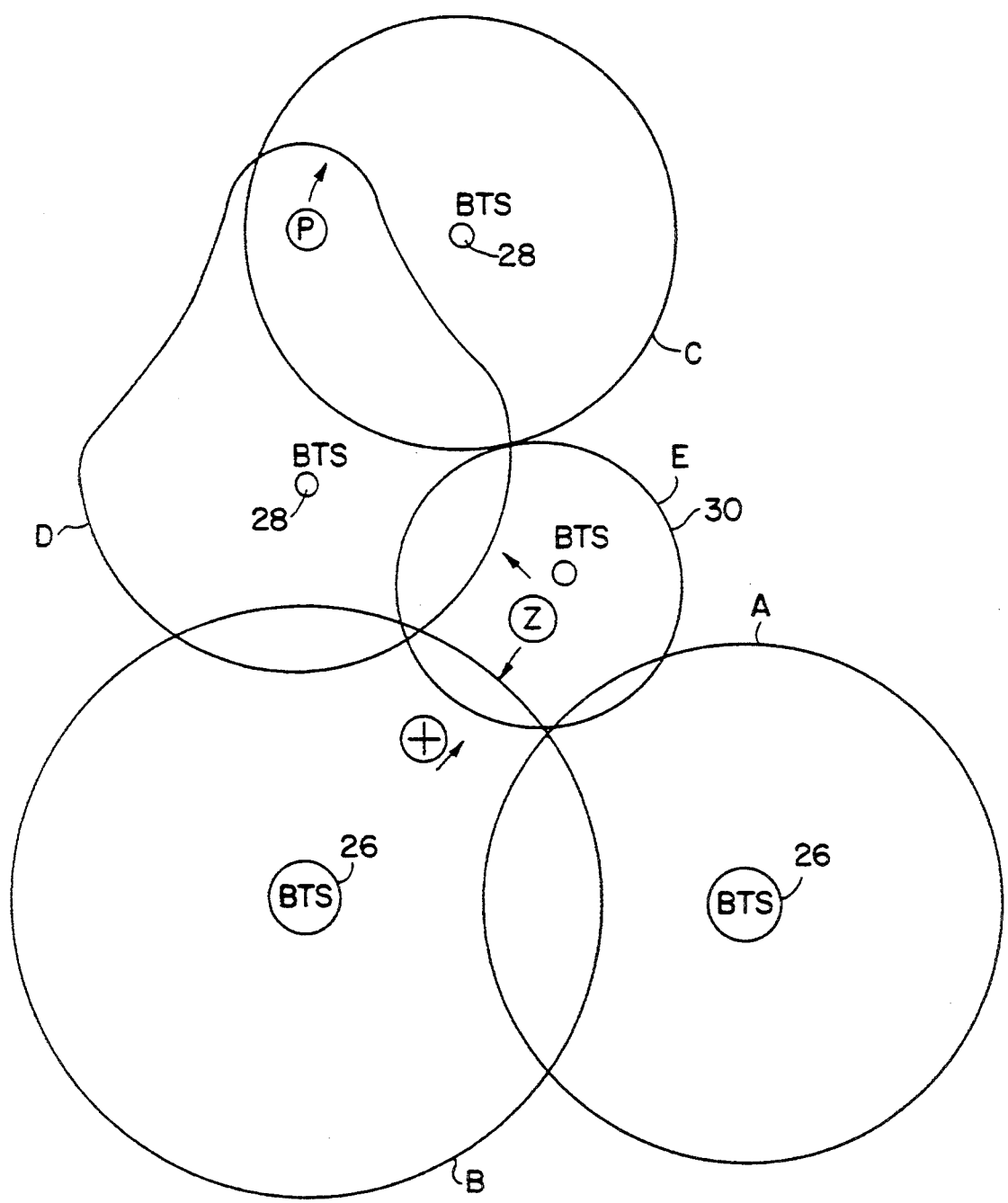
FIG. 4 is a diagram of a typical arrangement of a number of overlapping cells.

Referring to FIG. 4, each one of the circles represents an individual cell. Each of the cells overlap neighboring cells, and one referred to as C1 through C15. Each cell is configured as either a class I, II, or III cell. In turn, each cell of the same class has a priority designation. Thus, class I cells each have a priority designation such as one through four, for example, class II cells, a designation of one through three, and class III cells a designation of one through seven, for example.

A more detailed description of the method and apparatus of the invention is provided herein in connection with a description of operation. In describing the operation, reference will be made to FIGS. 4 through 8, as appropriate.

The method and apparatus of the present invention include generation of a handoff measurement list. As herein embodied and referring to FIGS. 5, the list is generated while the mobile travels away from the serving cell, and may be transmitted to the mobile unit. In a mobile assisted hand off mechanism, the mobile unit measures the RF signal strength of the specific control or traffic channels, and sends a corresponding message referred to as a channel quality measurement message (CQM) to the base station controller (BSC) of the serving cell. This message is received at the switching transcoder module (STM). Cell preselection takes place as hereinafter described in connection with FIG. 7. During preselection, a cell selection threshold is computed.

In accordance with the invention, the measurement list is selected, a measurement order is transmitted to the mobile unit; and if no candidate cells are preselected from this measurement list, and the measurement list contains cells in excess of twelve that have not been reported, a new measurement list is selected which replaces N cells of the previous list having the lowest signal strength measurements with unreported cells from the measurement list. If the measurement list contains candidate cells that are equal to or less than twelve in number, the cell preselection takes place at the STM, otherwise the channel quality measurement message from the mobile unit is sent to the channel access processor (CAP) where cell preselection takes place. During cell preselection as described in connection with FIG. 7, a handoff request message containing the preselected cells, neighboring cell RF signal strengths, and handoff parameters is sent to the call control processor CCP.

Figure 5:
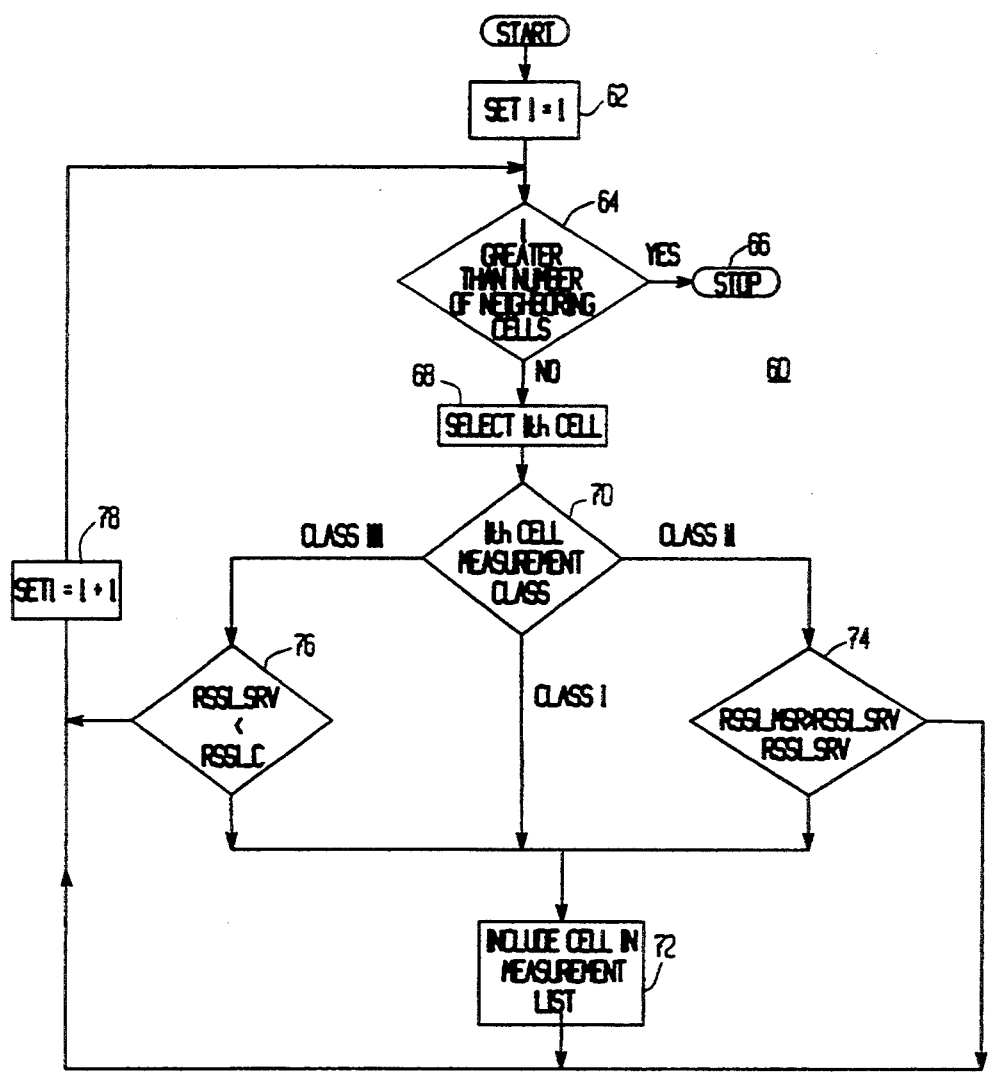
FIG. 5 is a flow chart illustrating measurement list generation.

Referring to FIG. 5, a counter is set at step 62. In the event there are no available neighboring cells for the measurement list, as indicated at step 64, the routine is stopped at step 66. In the event that there are detected neighboring cells, a cell is chosen at step 68, and segregated into a measurement class at step 70. As previously described, class I cells are immediately included in the measurement list as indicated at step 72. Class II cells are included in the measurement list when their handoff measurement threshold RSSI-MSR is greater than a value corresponding to the current traffic channel RF signal strength RSSI-SRV, as indicated at step 74. A cell classified as a class III cell as indicated at step 76 is added to the measurement list when the RF signal strength of the current serving cell RSSI-SRV is less than the critical threshold (RSSI-C) of the selected cell. After a cell has been included in the measurement list at 72, or is not included in the measurement list because of not meeting the criteria in block 74 and 76, the counter is incremented at step 78 and the routine is stopped at step 66 when the counter is at a number greater than the number of neighboring cells as indicated at step 64.

Figure 6:
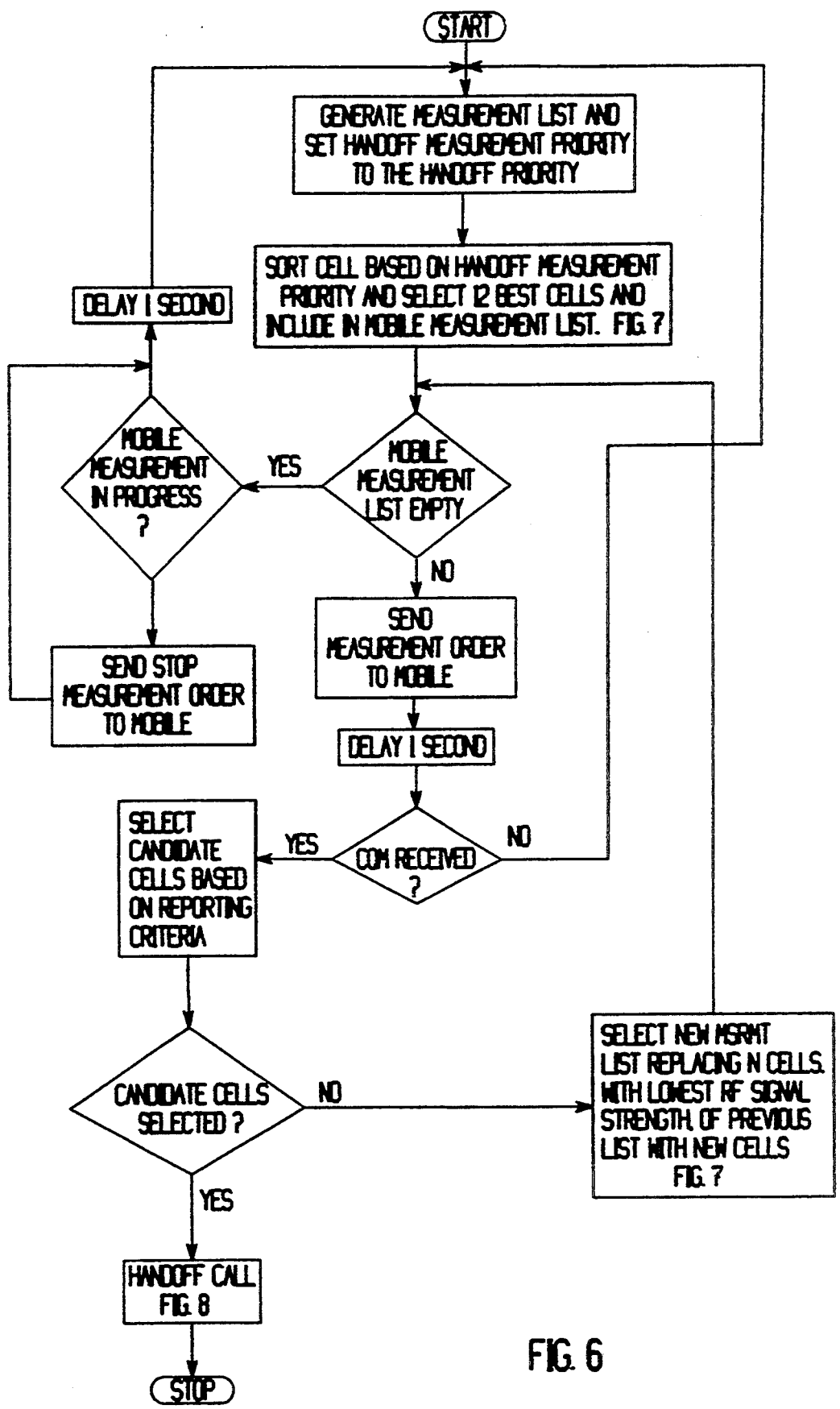
FIG. 6 is a flow chart illustrating measurement processing at the base station controller.

Referring to FIG. 6, the measurement list is generated and handoff measurement priority is set to the handoff priority at step 60. The list is then sorted based on the handoff measurement priority, and the twelve best cells are selected and included in the measurement list as indicated at step or block 61 and described in connection with FIG. 7. A decision is made at step 80 as to whether or not the measurement list is empty, that is, whether or not the list includes any neighboring cells that meet the previous criteria, or are classified as class I cells. In the event there are no neighboring cells in the measurement list, the system checks as to whether or not measurement at the mobile is in progress at step 82. In the event that measurement is in progress, a stop measurement order is sent to the mobile unit as indicated at step 84; and the routine is delayed one second as indicated at step 86 prior to generating another measurement list at step 60. If the measurement list compiled in accordance with FIG. 5 is not empty, then a measurement order is sent to the mobile unit at step 88. After a delay of one second as indicated at step 90, a decision is made at step 92 at to whether or not a channel quality measurement (CQM) has been received from the mobile unit. If no CQM message has been received, the routine is recommenced as indicated by line 94 for selection of a measuring list. If the CQM measurement has been received, then the system selects the candidate cells based upon certain reporting criteria as indicated at step 96 and shown in FIG. 7. If no candidate cells are selected at step 98, from the cells selected based on reporting criteria at step 96, then a new measurement list is selected replacing the cells with the lowest RF signal strength of a previous list with new cells as indicated at step 100 and described in connection with FIG. 7. In the event that the candidate cells are selected at step 98, then a handoff call is processed at step 102.

Figure 7:
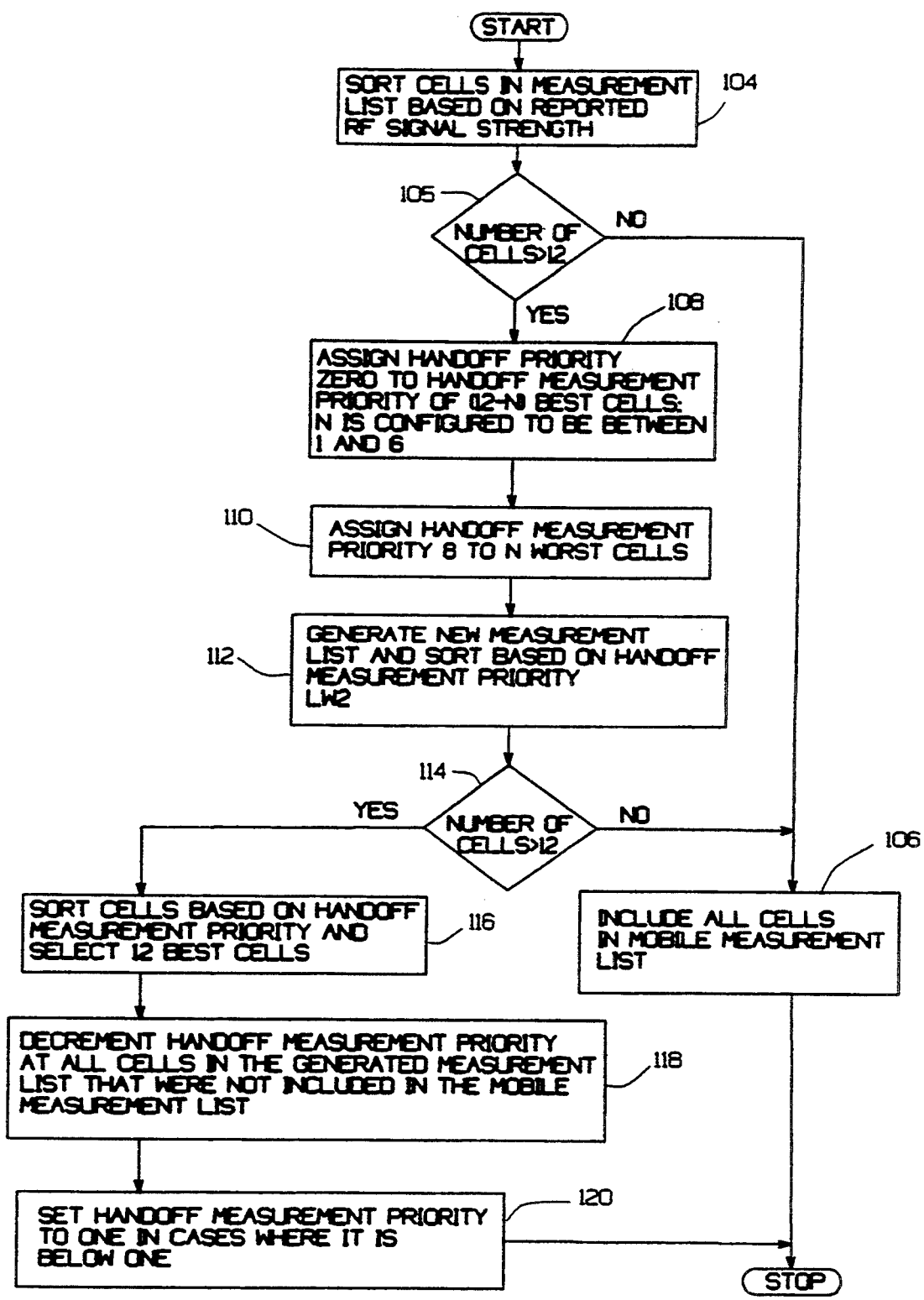
FIG. 7 is a flow chart illustrating the steps in generating a measurement list upon receipt of channel quality messages in accordance with the present invention.
Figure 8:
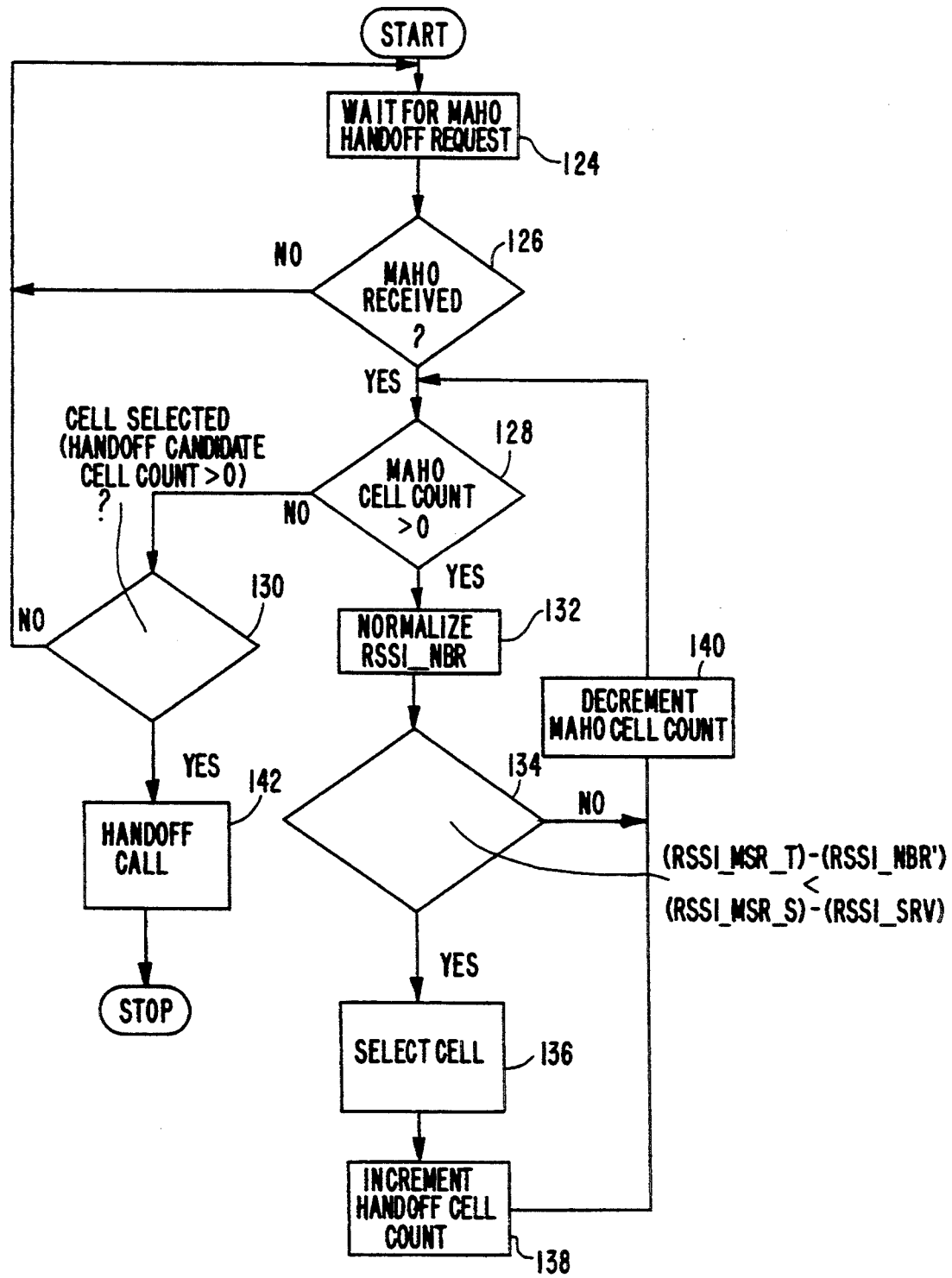
FIG. 8 is a flow chart illustrating the steps in the final handoff cell selection in accordance with the present invention.

As shown in FIG. 7, the selection of candidate cells is indicated at step 96 of FIG. 6 after the channel quality measurement are received. Then, if no candidate cells are selected at 98, the measurement list is sorted based on the RF signal strength of the cell of the mobil unit as indicated at 104. If the number of cells do not exceed twelve, as indicated at 105 all of the cells in the mobile measurement are included in the measurement list as indicated at block 106.

However, if the number of cells exceeds twelve in the measurement list a handoff priority of zero to a measurement priority of twelve minus N cells, N is configured to be between one and six at block 108. Handoff measurement priority eight is then assigned to the worst cells as shown at step 110. At step 112 a new measurement list is generated based on the handoff measurement priority at steps 108 and 110. If the number of cells in the list generated at block 110 is not greater than twelve at block 114, all the cells are included in the measurement list. If the number of cells at 112 is greater than twelve at 114, then the cells are sorted based on handoff measurement priority with the twelve best cells selected at step 116. All cells in the measurement list that were not included in the mobile measurement list have their priority decremented at step 118. If the decremented priority is less than one, the handoff measurement priority is set to one at step 120. The number of cells that are replaced may vary depending on the total number of cells in the measurement list. For example if there were a total of four unreported cells after no candidate cells were selected, then four of the cells could be replaced. For example, if there were more unreported cells, it may be desirable to substitute a greater portion of unreported cells for repeating the measurement order.

The apparatus and method of the present invention provides for performing handoff to one of the reported traffic channels at times when the one reported traffic channel meets a predetermined criteria. As herein embodied and referring to FIG. 8, for example, the actual handoff awaits the request of step 124. When received as indicated at step 126, existence of MAHO candidate cells is determined at step 128. If there are no candidate cells at 128 and there are no selected candidate cells at 130, the routine goes back to start. If there is a candidate cell, it is normalized at step 132, as previously described. This numbered value is then subtracted from RSSI-MSR-T, and compared with a value corresponding to RSSI-SRV subtracted from RSSI-MSR-S at step 134. If the criteria at 134 is met, then the cell is selected for handoff at step 136. After the cell is selected, the handoff cell count is increased and the cells awaiting final selection is decreased as determined at steps 138 and 140, and if the cell is selected at 130 a handoff cell is made at 142.

If the value RSSI-NBR is greater than the computed threshold RSSI-THP, then the cell is included in the candidate list at step 112 as previously described. Whenever cell preselection takes place, as indicated at step 98 of FIG. 6, a mobile assisted handoff request message containing the preselected cells, a signal strength RSSI-NBR of a neighboring cell, and handoff parameters, is sent to the channel control processor CCP where it is processed as shown in FIG. 2. Upon receiving the mobile assisted handoff cell selection message, the CCP performs final cell selection if scanning receiver confirmation is not required. Final cell selection is preferably based on the mobile assisted handoff mechanism as described.

It will be apparent to those skilled in the art that various modification and variations can be made in the method and system of the present invention without departing from the spirit or scope of the invention. Thus, it is intended that the present invention cover modification and variations of this invention provided they come within the scope of the appended claims and their equivalents.

What is claimed:

1. A method of handing off an on-going communication of a mobile unit leaving a serving cell to a neighboring cell of a cellular communication system, wherein the mobile unit has a scanning receiver for measuring received signal strength of a predetermined maximum number of scanned channels in a scanning sequence, the method comprising the steps of generating a measurement list at the serving cell that includes channels of a plurality of designated neighboring cells, requesting the mobile unit to measure a plurality of channels of the plurality of designated neighboring cells;

reporting by the mobile unit to the base station of the serving cell, the channel quality measurements;

replacing a portion of the plurality of channels with unreported channels of the generated measurement list at times when none of the reporting channels meet a handoff criteria and the total number of cells of the measurement list exceeds a maximum number of channels scannable in a sequence by the mobile unit;

repeating the steps of generating, requesting, reporting, and replacing until all the channels of the measurement list are scanned by the mobile unit or until one of the channels of the measurement list meets the handoff criteria, whichever is first to occur; and performing handoff to said one of the channels meeting the handoff criteria.

2. The method of claim 1 wherein the step of replacing comprises the substeps of eliminating from a repeated measurement request, a predetermined number of channels having the least previously reported signal strengths.

3. The method of claim 1 wherein the step of generating a measurement list, comprises:

sorting cells in accordance with a handoff measurement priority; and selecting twelve of the cells having channels with the highest signal strength measurements to include in the measurement list.

4. The method of claim 3 wherein the step of generating the measurement list, comprises sorting cells based on RF signal strength measurements of channels of the cells;

assigning values for handoff priority from zero to a handoff priority of 12-N for the best cells where N is between 1 and 6;

assigning a handoff priority of 8 to N cells having the lowest signal strength measurements of channels; and generating and sorting a new measurement list, based on the handoff priority, for scanning by the mobile units.

5. The method of claim 1 wherein the step of replacing comprises selecting the individual channels for replacement in accordance with previously reported signal strengths.

6. Apparatus for handing off an ongoing communication of a digital mobile unit in a serving cell to one of a plurality of neighboring cells of a cellular communication system wherein the digital mobile unit is limited to scanning in a scanning sequence a predetermined maximum number of neighboring cell channels, the apparatus comprising means in each cell responsive to a transmission signal threshold of a mobile unit for initiating a mobile assisted handoff;

means responsive to the initiated handoff for generating a measurement list of channels of identified neighboring cells for transmission to the mobile unit;

means for scanning a plurality of the channels at the mobile unit to obtain signal strength measurements;

means for reporting by the mobile unit to the serving cell the signal strength measurements of the plurality of channels;

means for receiving, at the serving cell, the signal strength measurements reported by the mobile unit;

means for replacing a portion of the channels for which measurements were reported by the mobile unit with unreported channels of the generated measurement list at times when none of the plurality of channels meets a handoff criteria and the total number of channels of the measurement list is greater than the maximum number of channels scannable in a scanning sequence by the mobile unit;

means coupled to the generating means for causing the generating means to repeat the generation of a new measurement list and coupled to the scanning means for causing the scanning means to repeat scanning from the new measurement list, whereby the reporting means and receiving means repeat reporting and receiving of signal measurements until all channels of the measurement list are scanned by the mobile unit or until one of the channels meets a handoff criteria whichever is first to occur; and means for handing off the mobile unit communication to a cell having said one channel in response to said one channel meeting the handoff criteria.

7. The apparatus of claim 6 wherein the replacing means includes means for eliminating from a subsequent measurement list a predetermined number of channels having the least signal strength measurements previously reported by the mobile unit.

8. The apparatus of claim 6 wherein each of the neighboring cells has a classification and priority designation for inclusion in the measurement list.

9. The apparatus of claim 6 wherein the means for initiating a mobile assisted handoff comprises:

means for generating a measurement list based on RF signal strength of the cells, and selecting twelve of the cells having channels with the greatest signal strength measurements to include in the measurement list.

10. The apparatus of claim 6 wherein the means for generating a measurement list comprises:

means for sorting the measurement list based on RF signal strength measurements of channels of cells in the measurement list;

means for assigning to cells a handoff priority from zero to handoff measurement priority of twelve-N for cells having channels having the highest signal strength measurements where N is 1 to 6;

means for assigning a handoff priority of 8 to N cells having the lowest signal strength measurements of channels; and selecting twelve of the cells having channels with the highest signal strength for scanning of channels by the mobile unit.

11. A method of handing off an on-going communication of a mobile unit leaving a serving cell to a neighboring cell of a cellular communication system, wherein the mobile unit has a scanning receiver for measuring received signal strength of a fixed maximum number of scanned cells concurrently, the method comprising providing a first measurement list at the serving cell base station that includes a plurality of designated neighboring cells;

requesting initially that the mobile unit measure the signal strength of a plurality of the cells of the first measurement list;

reporting, by the mobile unit, to the base station of the serving cell, the quality measurement of the signals of each of the plurality of cells of the initial requested measurements up to the fixed maximum number of scanned cells;

replacing a selected number of the plurality of cells with other cells of the first measurement list at times when the total number of cells in the first measurement list exceeds the fixed maximum number of scanned cells of the mobile unit and none of the scanned cells meets a handoff criteria list;

providing a subsequent measurement list for the other cells and a selected number of the said plurality of cells;

requesting subsequently that the mobile unit measure the signal strength of the subsequent measurement list;

reporting the measured signal strength of the subsequently requested cells; and performing a handoff at times when one reported cell meets the handoff criteria.

12. The method of claim 11 wherein the step of replacing the subsequent measuring list comprises the substeps of assigning a high handoff measurement priority to a selected number of the cells reporting the highest signal strength at the mobile unit;

assigning a low measurement priority to a selected number of the cells reporting the weakest signal strength; and forming the subsequent measurement list at least from highest signal strength reported cells and the unreported cells.

13. The apparatus of claim 11 wherein the means for replacing comprises means for selecting the cells for replacement in accordance with previously reported signal strengths.

14. Apparatus for handing off an on-going communication of a digital mobile unit in a serving cell to one of a plurality of neighboring cells of a cellular communication system wherein the digital mobile unit is limited to scanning at any one time a fixed number of channels of neighboring cells;

first means for selecting neighboring cells for inclusion in a measurement list in accordance with a configured measurement class and priority designation within the measurement class of each neighboring cell, signal strength of the mobile unit measured in the serving cell, signal, and strength of the serving cell traffic channel;

second means for selecting 12 of the best cells in accordance with the measurement class and priority;

third means for transmitting a measurement order to the mobile unit;

fourth means for reporting, by the mobile unit, channel quality measurement to the serving cell;

fifth means for selecting candidate cells for handoff based on a reporting criteria of the channel quality measurement;

sixth means for selecting a new measurement list at times when no candidate cells are selected for handoff, the selecting means including means for replacing with new cells these previous candidate cells with lowest RF signal strength of the list generated by the first selection means; and means for handing off the on-going communication in response to the selected candidate cells by the fifth means.

15. The apparatus of claim 14 wherein the sixth means for selecting a new measurement list comprises means for increasing the priority level of all cells not included in the measurement list generated by the first means.

* * * * *